Jan. 28, 1958     P. R. NASH ET AL     2,821,039
DISPLAY SIGN BRACKET
Filed Sept. 30, 1955
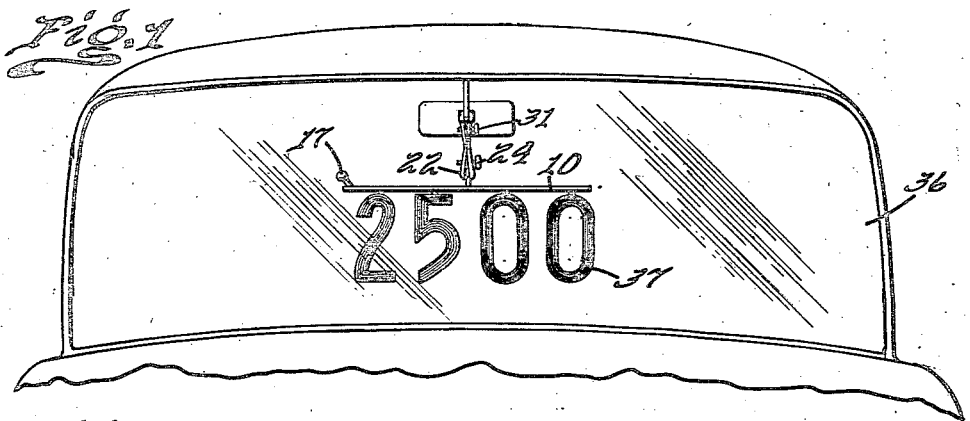
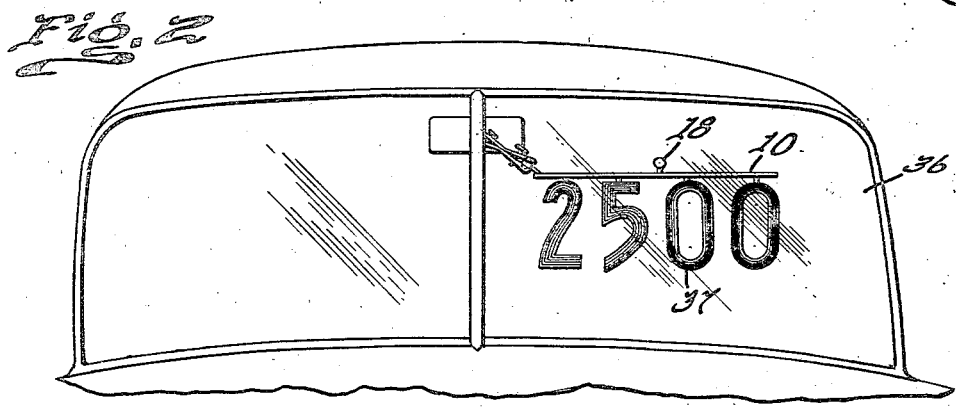
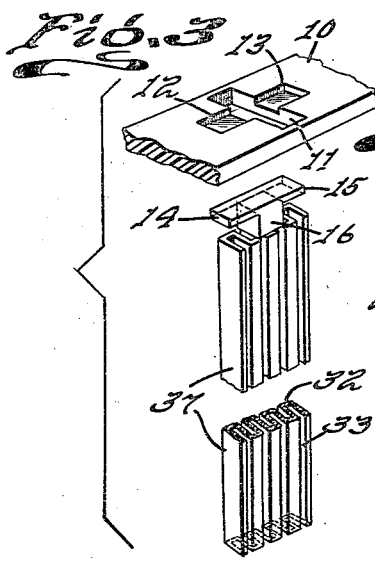
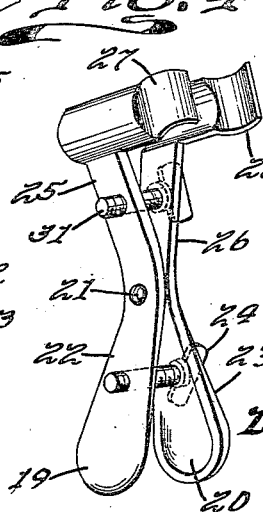
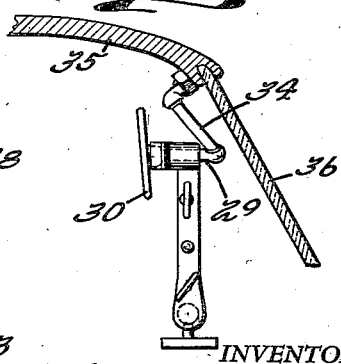
INVENTOR.
Price R. Nash &
Loretta E. Kerr
BY Victor J. Evans & Co.
ATTORNEYS

 2,821,039

DISPLAY SIGN BRACKET

Price R. Nash and Loretta E. Kerr, Twin Falls, Idaho

Application September 30, 1955, Serial No. 537,637

2 Claims. (Cl. 40—142)

This invention relates to display signs particularly of the type adapted to display the costs of motor vehicles through windshields or windows thereof, and in particular a horizontally disposed bar having openings therethrough by means of which numerals are adapted to be suspended and means for adjustably mounting the bar through the bracket of a rear view mirror of a motor vehicle or on other parts of the vehicle.

The purpose of this invention is to facilitate suspending price cards or numerals indicating the price of a vehicle on the interior of the vehicle and wherein the price of the vehicle may readily be ascertained.

Various types of price tags and cards have been used for displaying prices of articles and particularly motor vehicles, however, because of the pattern or design of the interior of a motor vehicle it is difficult to position a price card on the inside of the vehicle so that the price is advantageously or attractively displayed through the windshield or windows of the vehicle. With this thought in mind this invention contemplates an improved support including a horizontally disposed bar with openings therethrough and with notches in the upper surface with a clamp or bracket for suspending the bar in a motor vehicle and particularly from the rear view mirror thereof and numerals, letters, or the like having T-shaped formations on upper ends thereof and in which the T-shaped formations are adapted to be positioned in slots in the bar for retaining the numerals, letters, or the like in an unobstructed position on the inside of a vehicle.

The object of this invention is, therefore, to provide a bracket for displaying numerals representing the price or down payment of a vehicle or price tags or cards or other display matter through the windshield or windows of a vehicle.

Another object of the invention is to provide a bracket for displaying numerals, letters, and the like on the interior of a vehicle in which the device is adapted to be attached to the vehicle without screws, bolts, or other fastening elements.

A further object of the invention is to provide a bracket for suspending numerals, letters, price tags or cards or other indicia from the interior of a vehicle through the windshield or windows thereof in which the bracket is of a simple and economical construction.

With these and other objects and advantages in view the invention embodies a bracket including a horizontally disposed bar having cross recesses in the upper surface with openings extended through the recesses and in which T-shaped elements on upper ends of letters, cards, and the like may be positioned, and a clamp having arcuate sockets at one end adapted to be clamped over balls extended from the bar, and friction gripping elements on the opposite end with which the device may be attached to the bracket of a rear view mirror or the like.

Other features and advantages of the invention will appear from the following description taken in connection with the drawing, wherein:

Figure 1 is a front elevational view looking toward the windshield of a motor vehicle showing numerals indicating the price of the vehicle suspended from the bracket of the rear view mirror thereof.

Figure 2 is a front elevational view similar to that shown in Fig. 1 showing the bar upon which the numerals are suspended extended to one side of the center of a windshield making it possible to display the price without the numerals being obstructed by the dividing bar at the center of the windshield.

Figure 3 is a perspective view showing a section of the bar from which the numerals are suspended and also showing a letter or numerals positioned below the bar and having a T on the upper end adapted to be retained in crossed recesses in the bar.

Figure 4 is a perspective view showing the clamp for securing the bar to the bracket of the rear view mirror or the like.

Figure 5 is a cross section through the upper portion of a windshield of a motor vehicle showing the clamp illustrated in Fig. 4 secured on the shank of a rear view mirror with the bar for suspending the figures, letters, or the like depending from the clamp.

Referring now to the drawing wherein like reference characters denote corresponding parts the improved price tag suspending bracket of this invention includes a bar 10 having transversely disposed openings 11 extended therethrough with longitudinally positioned recesses 12 and 13 extended from the sides of the opening and positioned to receive arms 14 and 15 of a T having a shank 16 on the upper end of a numeral, such as the numeral 1 illustrated in Fig. 3; and the bar is provided with balls 17 and 18 that are adapted to be secured in substantially semi-circular sockets 19 and 20 of a clamp having spring arms connected by a fastener 21 with sections 22 and 23 of the arms retained in clamping relation with balls or other objects by a thumb screw 24 and with sections 25 and 26 extended from the opposite side of the fastener 21 retained in clamping relation with arcuate jaws 27 and 28 thereof in gripping relation with a shank 29 of a rear view mirror 30 with a thumb screw 31.

The bar 10, which is rectangular-shaped in cross section may be provided in different lengths to accommodate different numbers of numerals, letters, or other indicia and although the bar is shown as being provided with a ball 17 at one end and a ball 18 at the intermediate part it will be understood that balls may be mounted at different points or other types of fastening elements may be provided on the bar.

As illustrated in Fig. 3, the stem or wide section of the numerals or letters may be provided with corrugated material having U-shaped sections 32 with slots 33 between the sections whereby the areas of the reflecting surfaces are increased to provide more light and greater reflection.

With the parts designed and assembled as illustrated and described the jaws 27 and 28 are adapted to be clamped over the shank 29 of a rear view mirror or over an arm, such as the arm 34 extended from the top 35 or upper edge of a windshield 36 and with one of the balls 17 and 18 secured between the sockets 19 and 20 at the opposite end of the bracket the bar 10 is adapted to be adjusted, preferably to a horizontal position whereby, numerals, letters, or other indicia suspended therefrom may be effectively displayed through the windshield or windows of the vehicle.

With the T-shaped elements extended from upper ends of the numerals, letters, or the like the arms 14 and 15 are placed through the transversely disposed slots 11 of the bar and turned to an angle of 90 degrees whereby the arms 14 and 15 nest in the sockets 12 and 13 so that the numerals, letters, or the like may be freely positioned in the bar and may be changed as desired.

The bar 10, with numerals or letters depending therefrom may be supported by the ball 18 with the numerals 37 in the center of the windshield, as shown in Fig. 1 or by the ball 17 with the characters extended to one side of the windshield.

It will be understood that modifications, within the scope of the appended claims, may be made in the design and arrangement of the parts without departing from the spirit of the invention.

What is claimed is:

1. In a price tag supporting bracket, the combination which comprises a bar having spaced transversely disposed openings therethrough with longitudinally positioned recesses extended from sides of the openings and positioned in the upper surface, characters with T's having arms extended from shanks extended from upper ends thereof, the T's being adapted to be extended through the transversely disposed openings of the bar and turned to an angle of 90 degrees with the arms positioned in said recesses in the upper surface of the bar.

2. In a display device having interchangeable characters with the top of each character having an outwardly extended shank with arms extending in opposite directions from the outer end thereof to provide a T-shaped formation; a support for the characters having a rectangular shaped opening extended therethrough transversely thereof and recesses extending from opposite longitudinal edges of the opening to receive the arms on the shank when the arms have been extended through the opening and the characters have been turned 90 degrees.

References Cited in the file of this patent

UNITED STATES PATENTS

| | | |
|---|---|---|
| 705,275 | Mosher | July 22, 1902 |
| 1,505,021 | Haslup | Aug. 12, 1924 |
| 1,861,599 | Gstalder | June 7, 1932 |
| 2,074,250 | Bone | Mar. 16, 1937 |
| 2,598,890 | Cisi et al. | June 3, 1952 |

FOREIGN PATENTS

| | | |
|---|---|---|
| 395,086 | Great Britain | July 13, 1933 |